US006560218B2

(12) United States Patent
McAllister et al.

(10) Patent No.: US 6,560,218 B2
(45) Date of Patent: *May 6, 2003

(54) SVC ROUTING IN NETWORK WITH STATIC ROUTING TABLES

(75) Inventors: Shawn McAllister, Nepean (CA); Nutan Behki, Nepean (CA); Richard Chan, Kanata (CA)

(73) Assignee: Alcatel Canada Inc., Kanata (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/813,984

(22) Filed: Mar. 22, 2001

(65) Prior Publication Data

US 2001/0010681 A1 Aug. 2, 2001

Related U.S. Application Data

(63) Continuation of application No. 09/065,062, filed as application No. PCT/CA96/00710 on Oct. 25, 1996, now Pat. No. 6,215,765.

(30) Foreign Application Priority Data

Oct. 25, 1995 (GB) .......................................... 95211831

(51) Int. Cl.[7] .............................................. H04L 12/28
(52) U.S. Cl. .................................. 370/351; 370/395.32
(58) Field of Search ................................ 370/237, 238, 370/236, 242, 244, 248, 230, 249, 250, 252, 256, 255, 351, 389, 238.1, 395.1, 395.3, 395.31, 395.32, 395.2; 709/238, 239, 241, 242

(56) References Cited

U.S. PATENT DOCUMENTS 4,345,116 A    8/1982  Ash et al. ........................ 179/18
5,130,982 A  * 7/1992  Ash et al. ........................ 370/352
5,649,108 A  * 7/1997  Spiegel et al. .................. 709/241
5,805,593 A  * 9/1998  Busche ............................. 370/396
5,933,412 A  * 8/1999  Choudhury et al. ............. 370/218
6,215,765 B1 * 4/2001  McAllister et al. ............. 370/217

OTHER PUBLICATIONS

"An alternate path routing scheme supporting QOS and fast connection setup in ATM networks", Spiegel et al., Institut of Electrical and Electronics Engineers, vol. 2 of 3, 1994, pp. 1224–1230.

"Operation and maintenace (OAM) mechanisms for layer management in ATM networks", G. Schroder, 13th Annual Conference on European Fibre Optics Communications and Networks, vol. 2, 1995, pp. 97–101.

"Explicit path routing for switching network", IBM Technical Disclosure Bulletin, 1976, vol. 18, No. 9, pp. 3059–3062.

* cited by examiner

Primary Examiner—David Vincent
(74) Attorney, Agent, or Firm—Marks & Clerk

(57) ABSTRACT

A method is disclosed for establishing a switched virtual circuit in a digital network having network nodes with static routing tables. The static routing tables contain at least primary and alternate routing data. When a node is unable to forward a call over its outgoing primary route due to congestion or physical failure and its alternate route is the same as the route on which a call setup request arrived, it clears the call at that node and sends a crankback message to the preceding node, which responds to the crankback message to attempt to dynamically re-route the call over the alternate route stored in the routing table of the preceding node. If the attempt is unsuccessful, it sends the message back to the next preceding node and so on.

15 Claims, 1 Drawing Sheet

SVC ROUTING IN NETWORK WITH STATIC ROUTING TABLES

Figure 1:
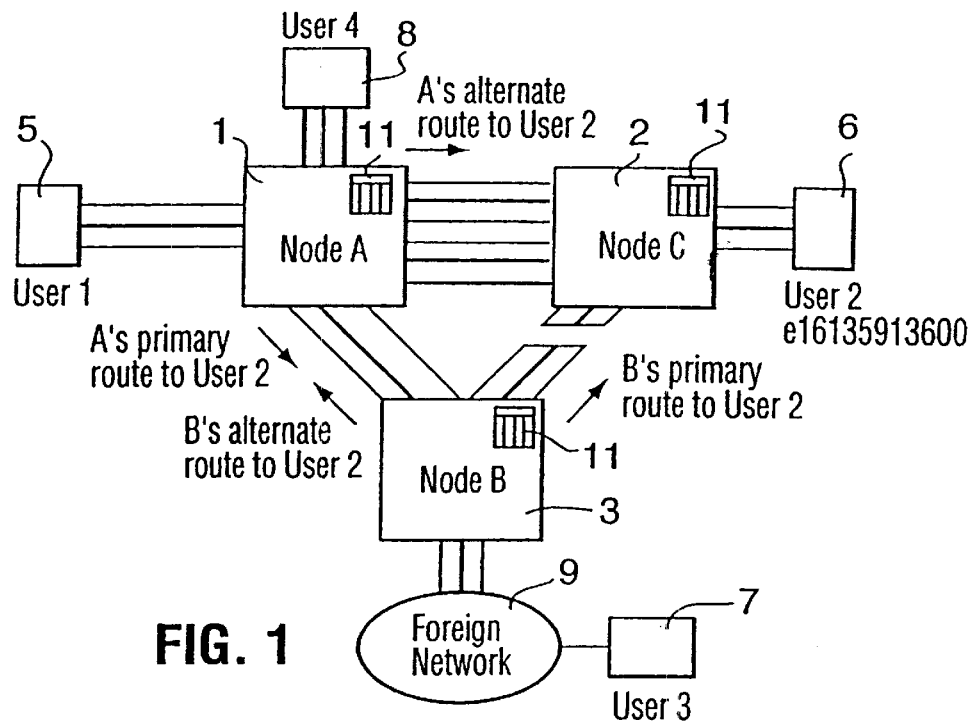

This application is a continuation application under 35 USC 120 of U.S. patent application Ser. No. 09/065,062 now U.S. Pat. No. 6,215,765 which is derived from PCT application no. PCT/CA96/00710 filed Oct. 25, 1996.

This invention relates to a method of establishing a switched virtual circuit in digital networks with static routing tables. The invention is applicable to any technology in which switched virtual circuits are set up through a packet switched network, for example, ATM and Frame Relay networks.

Congestion may occur on a network link if many incoming streams of traffic all terminate on the same outbound link, or the outbound link may busy or down due to a failure. Congestion is a problem in all networks. In packet switched networks, congestion is handled by end to end applications. There are no methods for handling congestion at the packet routing level. In circuit switched networks, bandwidth is reserved for each circuit by the network operator. Once again, there are no methods for handling congestion.

In networks which use switched virtual circuits (SVCs), a method is needed to reroute around congested or failed links. In the P-NNI protocol, which applies to dynamically routed SVC networks, a crankback IE (Information Element) is used for rerouting. When a node receives a call set-up request with which it is unable to comply, it sends a crankback IE back through the network. This IE passes through several nodes until it reaches a node which is programmed to respond to a crankback IE. This node, which is equipped to respond to a crankback element, then attempts to re-route the call on the basis of its current routing table.

This method, however, cannot be used in statically routed SVC networks, where the nodes contain manually pre-configured routing tables, which predetermine the path through the network that a call between any two endpoints will take. Furthermore, there is no mechanism to prevent continuous crankback attempts. In a network with static routing tables, failure in one of the configured links will result in failure of the call set-up process.

Routing loops may occur due to configuration errors, the use of alternate routes when failures occur, or transient routing tables after a failure in the network. Routing loops are also a problem in all networks. In statically routed packet and circuit switched networks, loops are assumed to be detected by the network operator. No loop detection mechanisms are present in these networks.

In networks which use switched virtual circuits, both transient loops and permanent loops are a problem. A reliable method of loop detection is therefore needed in these networks. The P-NNI protocol uses source routing to avoid loops. This adds unnecessary complexity to SVC routing.

The article "An Alternate Path Routing Scheme Supporting QOS and Fast Connection Setup in ATM Networks". Proceedings of the Global Conference, San Fransisco, Nov. 28–Dec. 2, 1994, vol. 2 of 3, by E. M. Spiegel et. al discloses to an alternate path routing scheme based on a combination of progressive control and source routing for use within a connection-oriented data communications network, namely an ATM network. Spiegel teaches that a source node, which is to setup a connection through the network to an endpoint, computes a primary (first) path from its routing table information. Source routing is utilized to effect this path computation which typically is a function of link cost and quality of service requirements. The source node also computes a cost threshold and crankback limit which, together with the computed primary path, are included in a connection setup message generated at the source node. Additionally, the setup message includes fields for accumulating the cost of a path fragment already established and for accumulating the number of crankbacks already completed.

The setup message is propagated along the primary path until either the network endpoint is reached or until the connection setup message encounters a blocked link at an intermediate node. The intermediate node, responsive to encountering the blocked link, then computes an alternate path as a new path tail through the network to the endpoint. Again this path computation is effected using source routing, but in this instance the node must take into consideration the re-route guidelines contained in the connection setup message. The total cost of the path, comprising the accumulated cost of the established path fragment together with the cost of the new path tail, must be less than or equal to the cost threshold specified in the setup message.

If no path tail that satisfies the cost threshold can be found by the node, and the connection setup message has not yet been cranked back the limit specified therein, then crankback proceeds to the previous node in the path fragment and that node in turn attempts to compute an alternate path using source routing and complying with the constraints specified in the setup message.

According to the present invention there is provided a method of establishing a switched virtual circuit call in a digital communications network comprising a plurality of network nodes, each network node having a local static routing tables providing next hop routing information to adjacent nodes, characterized in that said routing tables define a primary route and an alternate route to adjacent nodes; a network node receives a setup message for the call and searches its routing table for corresponding routing information; the node, based on the corresponding routing information, attempts to forward the setup message on the primary route; if the primary route is not usable due to congestion or physical failure, the node then attempts to forward the setup message on the alternate route; and if the alternate route is the same route on which the setup message is received, the node cranks the call back to a preceding node which either forwards the setup message over the alternate route defined in that node's routing table or again cranks the call back to a further preceding node.

Preferably, the crankback IE has a predetermined lifetime to prevent continuous crankback attempts.

Figure 2:
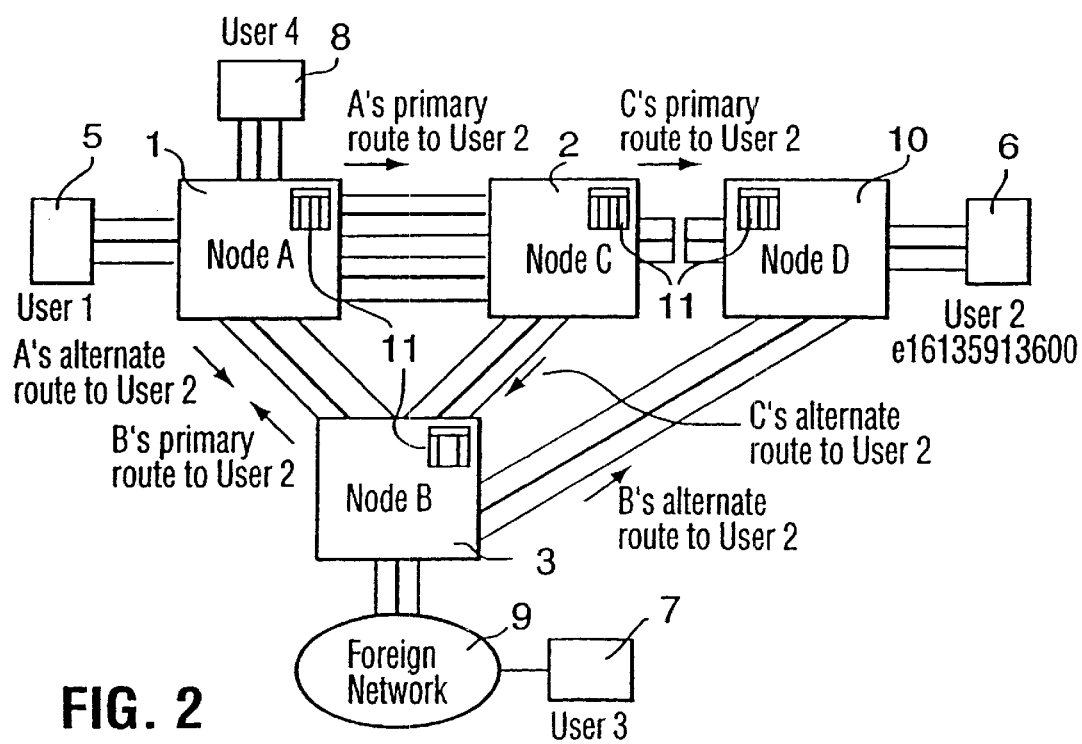

The invention will now be described in more detail, by way of example only, with reference to the accompanying drawings, in which:

FIG. 1 shows a portion of a digital network showing how the system routes SVCs around failures; and FIG. 2 illustrates the network with a different trunk group down and showing an extra node.

FIG. 1 shows a digital network comprising three switching nodes A, B, C, referred to as node A, node B, and node C, for example, ATM switches, and four users 5, 6, 7, 8, referred to as user 1, user 2, user 3, and user 4. User 1 and user 4 are connected to Node A, user 2 is connected to node C, and user 3 is connected to through a "foreign" network 9 to Node B. The nodes are connected via trunks 1 carrying SVCs (Switched Virtual Circuits).

Each node contains a local routing table 11 which is manually preconfigured when the network is setup to store the routes to adjacent nodes for reaching possible endpoints from that node. This is known as hop-by-hop routing. The routing tables 11 contain information pertaining to a primary route and an alternate route to use in the event that there is a failure or congestion on the primary route.

Suppose that the Primary Route for Node A, as stored in its routing table 11, to reach User 2 is via Node B and the Alternate Route is via Node C. On Node B, the Primary Route to User 2 is via Node C and an Alternate Route is via Node A.

In this example, all Trunk Groups between Node B and Node C are assumed to be down. A Setup message from User 1 to User 2 is routed by Node A to Node B in accordance with the information stored in its routing table 11. Node B detects that the Trunk Group in its Primary Route (via Node C) is down, so its Primary Route cannot be used. Node B also detects that its Alternate Route to User 2 is the same Route on which the setup message was received. Routing the call out the Alternate Route would therefore cause a loop and Node B therefore determines that it cannot forward the call to User 2 and clears the call back to Node A with a Release message indicating Crankback.

Node A receives the Crankback message, notes that its Primary Route didn't work and forwards the call on its Alternate Route, as stored in its routing table 11, to Node C. Node C then forwards the call to User 2. Without Crankback, the Trunk Group failure between Node B and Node C would prevent User 1 from establishing an SVC to User 2.

If this attempt fails, node A attempts to repeat the process back to the next preceding node and so on back through the network. In this example, the next preceding node is the originating user 1, so the call is cleared.

Crankback thus operates by regressing a call in progress back to a previous node in the call setup path to try an alternate route from that point. When a node cannot forward a call along its configured path, it clears the call at that node and sends a Release message to the previous node (called the Crankback destination) and includes a Crankback Information Element in the Release message to indicate Crankback (as opposed to normal call clearing). The Crankback destination has a record of the Route and Route List it used to forward this call. Upon receiving the Crankback, the Crankback destination knows that the Route it chose cannot be used to establish this call. It therefore chooses the next best Route from the Route List to forward the call. This newly-selected Route will take the call to a different node in an attempt to route around the failure. If there are no other Routes to chose from in the Route List, then the call is cranked back one more hop. If Crankback reaches the originating node and an alternate Route cannot be found, then the call is cleared back to the calling party.

In order to bound the number of SVC re-routing attempts, Crankback will be attempted only up to a maximum number of times before the call is cleared back to the originator. This is controlled using a hop count or time-to-live field in the signalling message. This field starts at a specific value and is decremented each time the signalling message is forwarded by an intermediate switch. When the field reaches a predetermined value, for example, zero, the call is cleared.

The use of static routing with alternate routes may also cause routing loops during failure conditions. Manually configuring SVC routing tables node by node, can also cause routing loops to be erroneously introduced. Loop detection is used to detect a looped Set-up or Add Party message and will either clear the call or use Crankback to indicate to previous nodes in the setup path that an alternate route must be chosen.

In the network shown in FIG. 2, and additional node 10, referred to as node D is located between node C and user 2.

If we assume that user 1 is establishing an SVC to User 2, node A's Primary Route to User 2 is via Node C, with its Alternate Route via Node B. The Primary Route from Node C to User 2 is via Node D with an Alternate Route via Node B.

When the Setup message arrives at Node C from Node A, Node C determines that its Primary Route is inoperative, and forwards the call along its Alternate Route, to Node B. Node B sends the call along its primary route to Node A. Node A detects the routing loop and clears the call back to Node B in a Release message indicating Crankback. Node B then chooses its Alternate Route and forwards the call to Node D, which delivers the call to User 2.

Looping of SVC Setup or Add Party messages can occur due to routing configuration errors or due to the use of alternate routes when failures occur. SVC looping in case 2 is detected with the use of a proprietary Transit List Information Element (IE) in the signalling messages. This IE (Information Element) records the nodes visited during the call setup. Upon detection of SVC looping, the detecting node cranks the call back to the previous node to allow rerouting to occur.

The described method enhances the crankback mechanism and allows its use in statically routed SVC networks. It also prevents looping in a simple and effective manner.

What is claimed is:

1. A method of establishing a call in a virtual circuit based communications network comprising a plurality of network nodes and employing hop-by-hop routing, each network node having a preconfigured routing table which contains next hop information to adjacent nodes for routes leading to endpoints of the network, comprising the steps of:

preconfiguring in said routing table of each individual network node next hop information associated respectively with a primary route and an alternate route to respective network endpoints;

sending a setup message having a destination endpoint for said call through said network;

receiving said setup message at a network node, said network node on receipt of said setup message searching its routing table based on the destination endpoint for corresponding next hop information identifying the next node on the primary route to the destination endpoint;

said network node attempting to forward the setup message on the primary route defined in the corresponding next hop information retrieved from said routing table for the primary route for said network node; and if the primary route is not usable, said network node ten attempting to forward the setup message on the alternate route defined in the corresponding next hop information stored in said routing table for the alternate route for said network node or cranking the call back to a preceding node which either forwards the setup message over the alternate route defined using the next hop information stored in its routing table for the alternate route or again cranks the call back to a further preceding node.

2. A method as claimed in claim 1, wherein the step of cranking the call back to said preceding node includes sending a release message having a crankback indication from the network node to the preceding node; and the preceding node, responsive to the crankback indication, either forwards the setup message over its alternate route, if it can do so, or again cranks the call back by sending release message having the crankback indication to the further preceding node.

3. A method as claimed in claim 2, wherein the call setup message and crankback indication have a predetermined lifetime to prevent continuous attempts of cranking back the call.

4. A method as claimed in claim 3, wherein the predetermined lifetime is a count of nodes that can still be visited during the call setup, said count is decremented each time the setup message is forwarded by a network node, and the call is cleared when the count reaches zero.

5. A method as claimed in claim 2, wherein said setup message is sent from a source endpoint and said call is cleared when the release message with the crankback indication reaches the source endpoint.

6. A method as claimed in claim 1, wherein said network node performs the step of cranking the call back to the preceding node if the alternate route is not usable.

7. A method as claimed in claim 6, wherein the primary or alternate routes are not usable due to congestion or physical failure, or looping is detected.

8. A method as claimed in claim 7, wherein looping is detected when the primary route or the secondary route is the same as the route on which the setup message is received by the node.

9. A method of controlling a network node for use in establishing a call in a virtual circuit based communications network comprising a plurality of network nodes and employing hop-by-hop routing, the network node having a routing table which contains next hop information to adjacent nodes for routes leading to endpoints of the network, comprising the steps of:

predefining a primary route and an alternate route for respective network endpoints as the next hop information in said routing table;

receiving a setup message including a destination endpoint;

searching the routing table based on the destination endpoint for corresponding next hop information; and attempting to forward the setup message on the primary route defined in the corresponding next hop information for the primary route; and if the primary route is not usable, then attempting to forward the setup message on the alternate route defined in the corresponding next hop information for the alternate route or cranking the call back to a preceding node in the communications network.

10. A method as claimed in claim 9, wherein the step of cranking the call back to said preceding node includes sending a release message having a crankback indication from the network node to the preceding node.

11. An apparatus used in a network node for establishing a call in a virtual circuit based communications network employing hop-by-hop routing, comprising:

a routing table which contains next hop information to adjacent nodes corresponding to endpoints of the network, the routing table predefining for respective endpoints a primary route and an alternate route to the next hop;

means for receiving a setup message having a destination endpoint;

means for searching the routing table based on the destination endpoint for corresponding next hop routing information for the primary route;

means for attempting to forward the setup message on the primary route defined in the corresponding next hop information for the primary route; and means, if the primary route is not usable, for attempting to forward the setup message on the alternate route defined in the corresponding next hop information for the alternate route or for cranking the call back to a preceding node in the communications network.

12. An apparatus as claimed in claim 9, wherein the means for cranking the call back to said preceding node includes means for sending a release message having a crankback indication from the network node to the preceding node.

13. A method for establishing of a call in a virtual circuit based communications network having a plurality of network nodes and employing hop-by-hop routing, comprising the steps of:

sending a setup message for said call through said network on a hop by hop basis, said setup message including an indication of hop count;

adjusting the indication of hop count at each network node receiving said setup message, whereby that node effectively is counted as a hop traversed by the message; and clearing the call back through the network when the indication of hop count has reached a predetermined count.

14. A method as claimed in claim 13, wherein the indication of hop count is a number of nodes that can still be visited during the call setup, said number is decremented each time the setup message is forwarded by a network node, and the call is cleared when the count reaches zero.

15. A method of establishing a call in a virtual circuit based communications network comprising a plurality of network nodes and employing hop by hop routing, each network node having a routing table which contains next hop information to adjacent nodes corresponding to endpoints of the network, comprising the steps of:

sending a setup message having a destination endpoint for said call through said network, said setup message including an indication of hop count;

receiving said setup message at a network node;

adjusting the indication of hop count, whereby the network node effectively is counted as a hop traversed by the message;

clearing the call back through the network when the indication of hope count reaches a predetermined count; and otherwise forwarding the setup message another hop to an adjacent node in accordance with the next hop information for the destination endpoint contained in its routing table.

\* \* \* \* \*